(12) United States Patent
Muntian

(10) Patent No.: US 12,204,956 B2
(45) Date of Patent: Jan. 21, 2025

(54) SYSTEMS AND METHODS FOR TRANSFERRING MULTIPLE DATA

(71) Applicant: Adam Mark Muntian, Myrtle Beach, SC (US)

(72) Inventor: Adam Mark Muntian, Myrtle Beach, SC (US)

( * ) Notice: Subject to any disclaimer, the term of this patent is extended or adjusted under 35 U.S.C. 154(b) by 0 days.

(21) Appl. No.: 18/751,231

(22) Filed: Jun. 22, 2024

(65) Prior Publication Data

US 2024/0427653 A1    Dec. 26, 2024

Related U.S. Application Data

(60) Provisional application No. 63/523,086, filed on Jun. 25, 2023.

(51) Int. Cl.
*G06F 9/54* (2006.01)

(52) U.S. Cl.
CPC .............. *G06F 9/543* (2013.01); *G06F 9/542* (2013.01)

(58) Field of Classification Search
CPC ...... G06F 9/45529; G06F 9/542; G06F 9/543; G06F 16/1734; H04L 41/06; H04L 41/0604
See application file for complete search history.

(56) References Cited

U.S. PATENT DOCUMENTS

| | | | |
|---|---|---|---|
| 11,361,075 B1* | 6/2022 | Singh | G06F 21/554 |
| 2018/0181553 A1* | 6/2018 | Fairweather | G06F 3/04842 |
| 2022/0206995 A1* | 6/2022 | Zadina | G06F 9/543 |

* cited by examiner

*Primary Examiner* — Andy Ho

(74) *Attorney, Agent, or Firm* — Thomas W. Galvani, P.C.; Thomas W. Galvani

(57) ABSTRACT

A method includes the steps of providing a computer with a processor, a system clipboard for storing data, and a custom clipboard for storing data, and performing a copy step N times, wherein N is an integer greater than zero. The copy step includes receiving a copy event for an Nth piece of data to the system clipboard, and intercepting the copy event for the Nth piece of data and saving the Nth piece of data in the custom clipboard. Then, after performing the copy step N times, the method includes performing a paste step P times, wherein P is an integer greater than one and less than or equal to N, and the paste step includes receiving a paste event for a Pth piece of data, and intercepting the paste event of the Pth piece of data and reading the Pth piece of data from the custom clipboard.

20 Claims, 5 Drawing Sheets

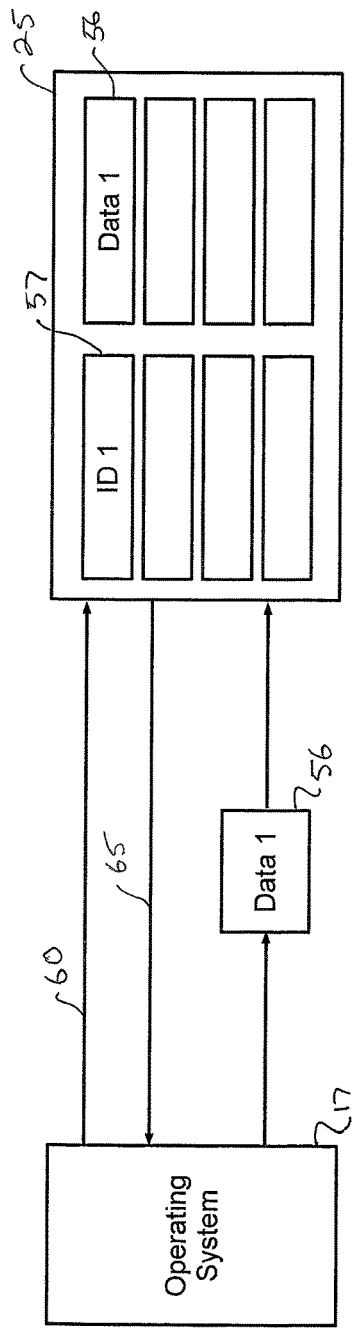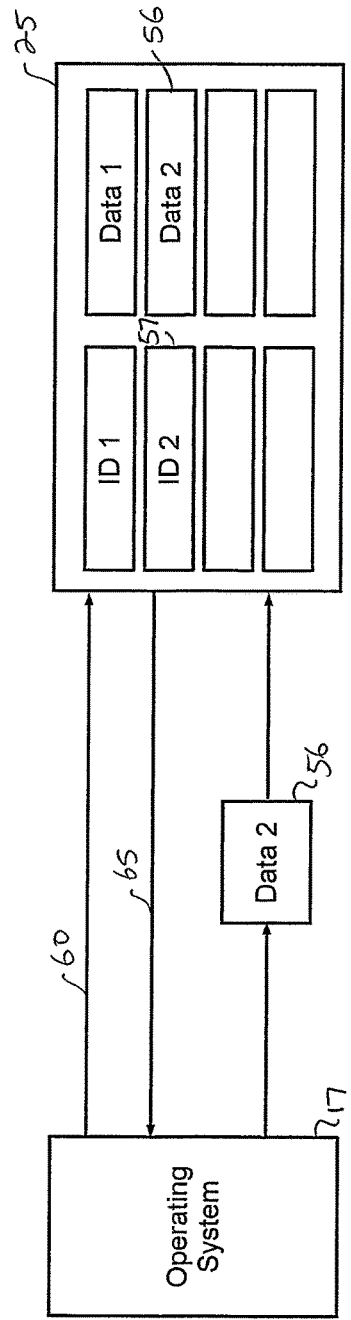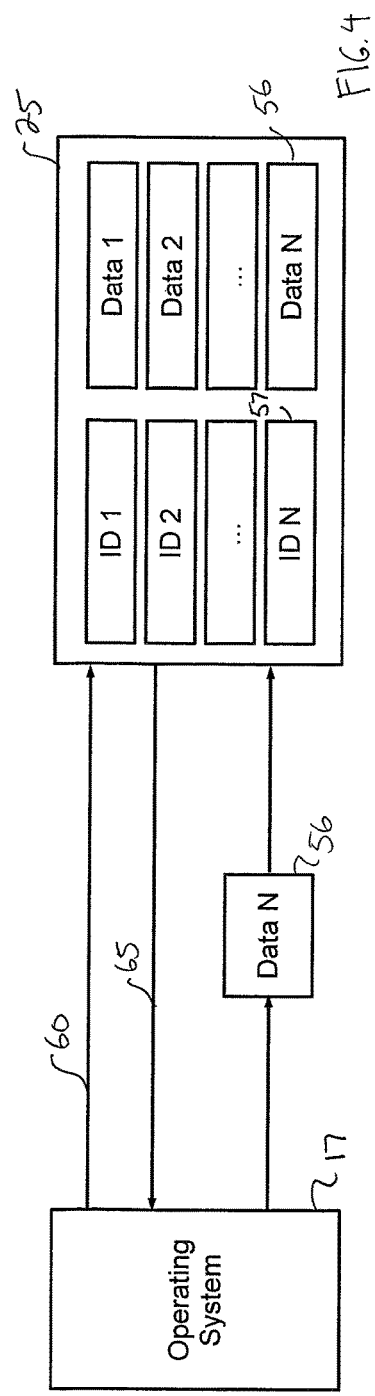
FIG. 4

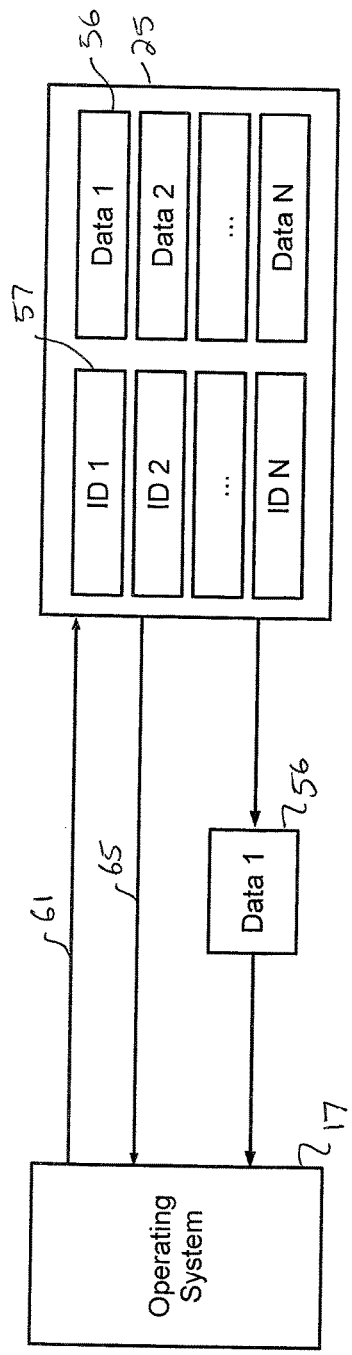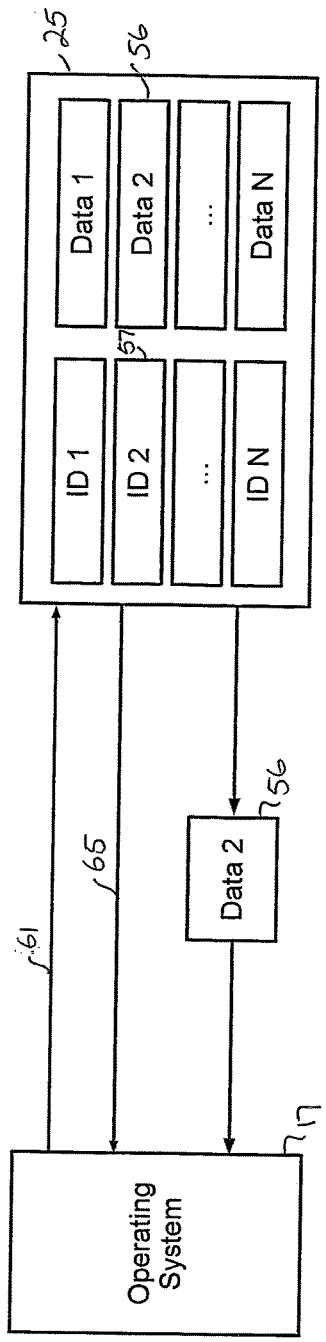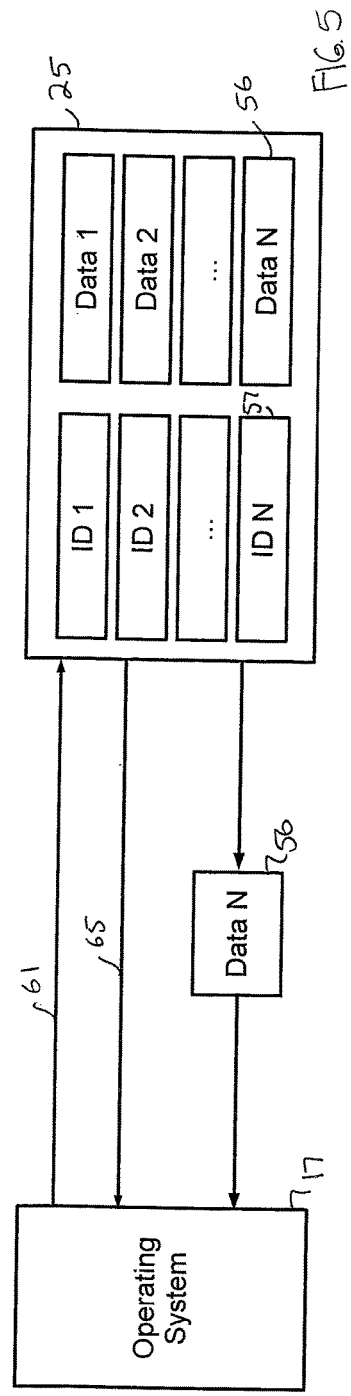
FIG. 5

SYSTEMS AND METHODS FOR TRANSFERRING MULTIPLE DATA

CROSS-REFERENCE TO RELATED APPLICATIONS

This application claims the benefit of U.S. Provisional Application No. 63/523,086, filed Jun. 25, 2023, which is hereby incorporated by reference in its entirety.

FIELD

The present specification relates generally to computers, and more particularly to devices and processes for improving buffer and memory operations of computers.

BACKGROUND

Copy and paste are basic functions that most computer operators use every day. Users copy a piece of data from one location and paste it in another. This can include copying a piece of data within one document and pasting it in another location within the same document, copying a piece of data from one document in an application and pasting it into another document in the same application, copying a piece of data from one application and pasting it in another application, or copying a piece of data from one storage medium location on a computer and pasting it into another storage medium location on that computer or another computer. There are many permutations of copy-and-paste functionality.

Humans and computers are great at doing this. We can quickly copy and paste information in this manner, and computers are designed to accommodate it. Computers quickly load copied data into memory buffer and then fetch it out of that buffer to paste the data.

Computers and users, however, are not great at copying multiple pieces of data. If two pieces of data need to be moved, the process is arduous. If more than two pieces of data need to be moved, the process becomes extremely aggravating.

For example, if first and second pieces of data need to be copied or moved from first locations to second locations, a multi-step process is required. The user copies the first data from the first location, navigates to the second location, pastes the first data in the second location, navigates back to the first location, copies the second data, navigates again to the second location, and pastes the second data. If the first and second locations are buried within deep file structures, navigating between the first and second locations requires a lot of clicking and a lot of time. If two pieces of data in a first location need to be copied to two separate locations, the process is even more difficult and annoying.

Surprisingly, there is no way to copy a first piece of data, copy a second piece of data, and then paste that first piece of data and then the second piece of data. An improved computer architecture is needed, and an improved device to use that computer architecture is needed as well.

SUMMARY

In an embodiment, a method for transferring multiple data, the method including the steps of providing a computer with a processor, a system clipboard for storing data, and a custom clipboard for storing data. The method includes intercepting a first copy event for a first data to the system clipboard, and passing the first copy event to an event API, the event API instructing the processor to process the first copy event by saving the first data in the custom clipboard. The method then includes intercepting a second copy event for a second data to the system clipboard, and passing the second copy event to the event API the event API instructing the processor to process the second copy event by saving the second data in the custom clipboard. The method then includes intercepting a first paste event for the first data, and passing the first paste event to the event API, the event API instructing the processor to process the first paste event by reading the first data from the custom clipboard, and intercepting a second paste event for the second data, and passing the second paste event to the event API, the event API instructing the processor to process the second paste event by reading the second data from the custom clipboard.

In embodiments, the step of intercepting a first paste event occurs before the step of intercepting a second paste event. In embodiments, the step of intercepting a second paste event occurs before the step of intercepting a first paste event. In embodiments, the step of intercepting the first copy event for the first data to the system clipboard, and passing the first copy event to the event API, the event API instructing the processor to process the first copy event by saving the first data in the custom clipboard further includes saving the first data in the custom clipboard with a unique first identifier, and the step of then intercepting the second copy event for the second data to the system clipboard, and passing the second copy event to the event API, the event API instructing the processor to process the second copy event by saving the second data in the custom clipboard further includes saving the second data in the custom clipboard with a unique second identifier. In embodiments, the step of intercepting the first paste event for the first data, and passing the first paste event to the event API, the event API instructing the processor to process the first paste event by reading the first data from the custom clipboard further comprises reading the first data from the custom clipboard with the unique first identifier, and intercepting a second paste event for the second data, and passing the second paste event to the event API, the event API instructing the processor to process the second paste event by reading the second data from the custom clipboard further comprises reading the second data from the custom clipboard with the unique second identifier. In embodiments, the steps of intercepting the first copy event, intercepting the second copy event, intercepting the first paste event, and intercepting the second paste event occur sequentially. In embodiments, the steps of intercepting the first copy event, intercepting the second copy event, intercepting the first paste event, and intercepting the second paste event occur non-sequentially. In embodiments, the copy event is a copy function. In embodiments, the copy event is a cut function. In embodiments, the method includes providing first and second input devices, performing the step of intercepting a first copy event in response to input from both of the first and second input devices, and performing the step of intercepting a second copy event in response to input from both of the first and second input devices. In embodiments, the method includes performing the step of intercepting the first paste event in response to input from both of the first and second input devices, and performing the step of intercepting the second paste event in response to input from both of the first and second input devices.

In an embodiment, a method for transferring multiple data includes the steps of providing a computer with a processor, a system clipboard for storing data, and a custom clipboard for storing data, and performing a copy step N times, wherein N is an integer greater than zero. The copy step includes receiving a copy event for an Nth piece of data to the system clipboard, and intercepting the copy event for the Nth piece of data and saving the Nth piece of data in the custom clipboard. Then, after performing the copy step N times, the method includes performing a paste step P times, wherein P is an integer greater than one and less than or equal to N, and the paste step includes receiving a paste event for a Pth piece of data, and intercepting the paste event of the Pth piece of data and reading the Pth piece of data from the custom clipboard.

In embodiments, the method includes providing first and second input devices, and performing the step of intercepting the copy event for the Nth piece of data in response to input from both of the first and second input devices. In embodiments, the method includes performing the step of intercepting the paste event for the Pth piece of data in response to input from both of the first and second input devices. In embodiments, the step of intercepting the copy event for the Nth piece of data and saving the Nth piece of data in the custom clipboard further includes saving the Nth piece of data in the custom clipboard with a unique identifier. In embodiments, the step of intercepting the copy event for the Nth piece of data and saving the Nth piece of data in the custom clipboard further includes saving the Nth piece of data in the custom clipboard with in an Nth location in the custom clipboard corresponding to the unique identifier. In embodiments, the step of intercepting the paste event of the Pth piece of data and reading the Pth piece of data from the custom clipboard further includes reading the Pth piece of data from the Nth location in the custom clipboard corresponding to the unique identifier. In embodiments, the step of intercepting the paste event of the Pth piece of data and reading the Pth piece of data from the custom clipboard further includes reading the Pth piece of data from the custom clipboard with the unique identifier. In embodiments, the copy event is a copy function. In embodiments, the copy event is a cut function.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings:

FIGS. 4 and 5 are diagrams illustrating copy and paste functionalities, respectively, of the method.

DETAILED DESCRIPTION

Figure 1:
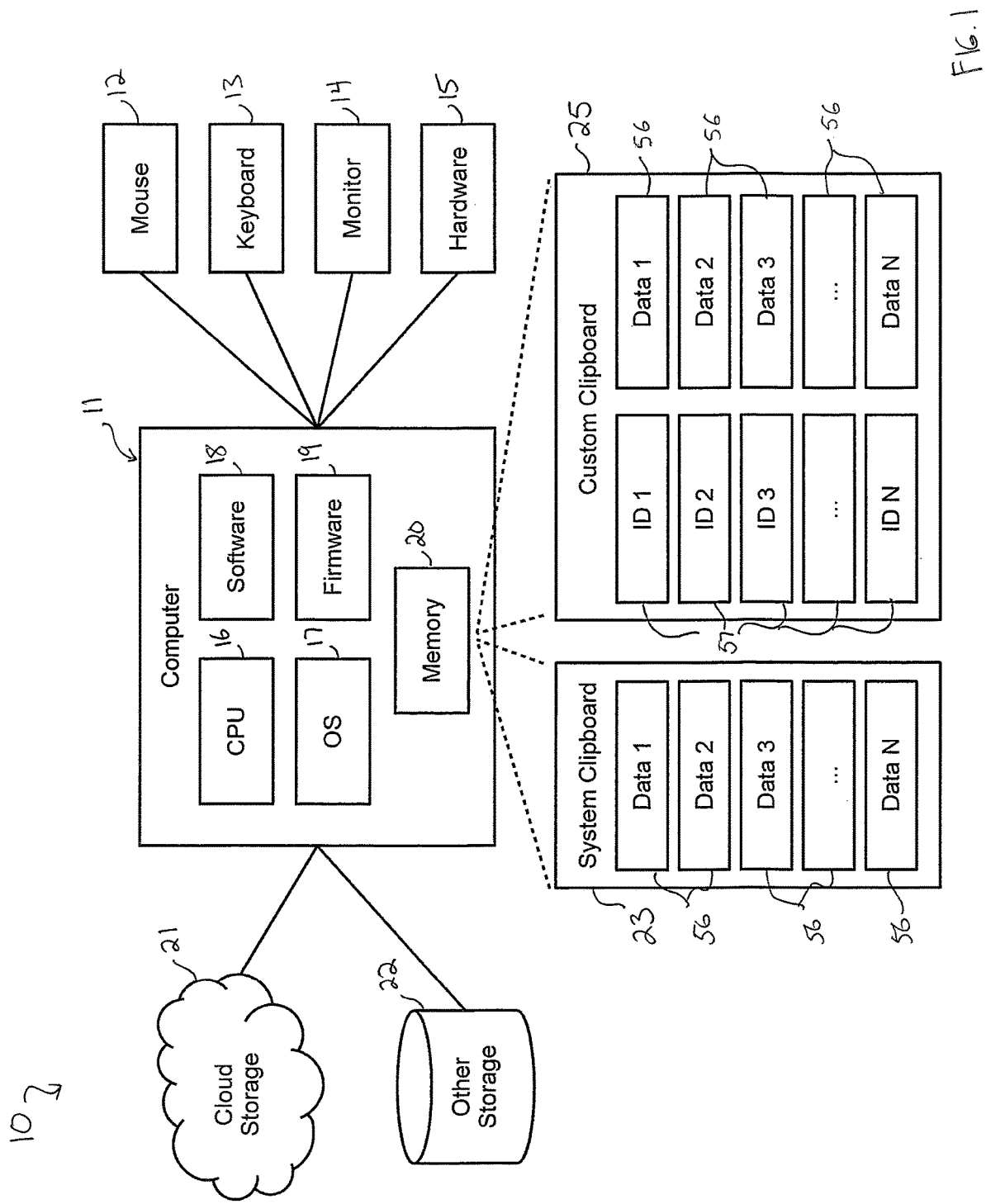
FIG. 1 is a schematic block diagram illustrating components of a system for executing a method for transferring multiple data.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1 illustrates a system 10 for transferring data and for transferring multiple in a computer 11. The computer 11 is specially-programmed to operate in the system 10 with hardware such as a mouse 12, keyboard 13, display or monitor 14, and other hardware 15. The computer 11 further includes a processor or CPU 16, an operating system 17, software 18, and firmware 19 for the hardware components.

The computer 11 also includes storage or memory 20. In some embodiments, the memory 20 is hard disk storage, while in other embodiments, it is solid state storage or some other type of storage. In some embodiments, the memory 20 is buffer memory, cache memory, RAM, dynamic RAM, static RAM, ROM, or another type of memory. Here, it is primarily identified as buffer memory or just "memory 20," but the reader should understand that it may include other types of memory 20, including several types of memory. The computer 11 also has access to cloud storage 21 and other storage 22.

These storage mediums expand the storage available to the computer 11 beyond just the memory 20. Cloud storage 21 preferably requires an Internet connection to access, but the other storage 22 has many forms, such as a hard disk or solid-state storage drive, flash drive, USB drive, a read/write CD or DVD, or another internal or external storage medium.

The software 18 in the system 10 contains a set of specially-programmed, executable instructions for running the system 10. These instructions may be specific to the system 10 with generic hardware or may be specific to the system 10 with specific hardware, such as, for example, a specific kind of mouse.

When the processor 16 executes the instructions, the processor reads or writes to the memory 20 in a particular manner, so as to enable the user to copy and paste multiple data. As a brief aside, the term "copy" here is used to describe both "copy" functionality and "cut" functionality. In both "copy" and "cut" functionality, a copy of the original data is made, the distinction lying only in whether the original data remains or is deleted. In a copy event, the data is copied and remains in its original location. In a cut event, the data is copied but deleted from its original location.

Referring still to FIG. 1, the memory 20 includes two locations for storing this copied data. A first location is a system clipboard 23. FIG. 1 shows data loaded into the system clipboard 23. The second location in the memory 20 is a custom clipboard 25, containing both data and identifiers for the data. The system 10 uses both the system clipboard 23 and the custom clipboard 25 to copy and paste multiple pieces of data in response to user instructions.

Figure 2:
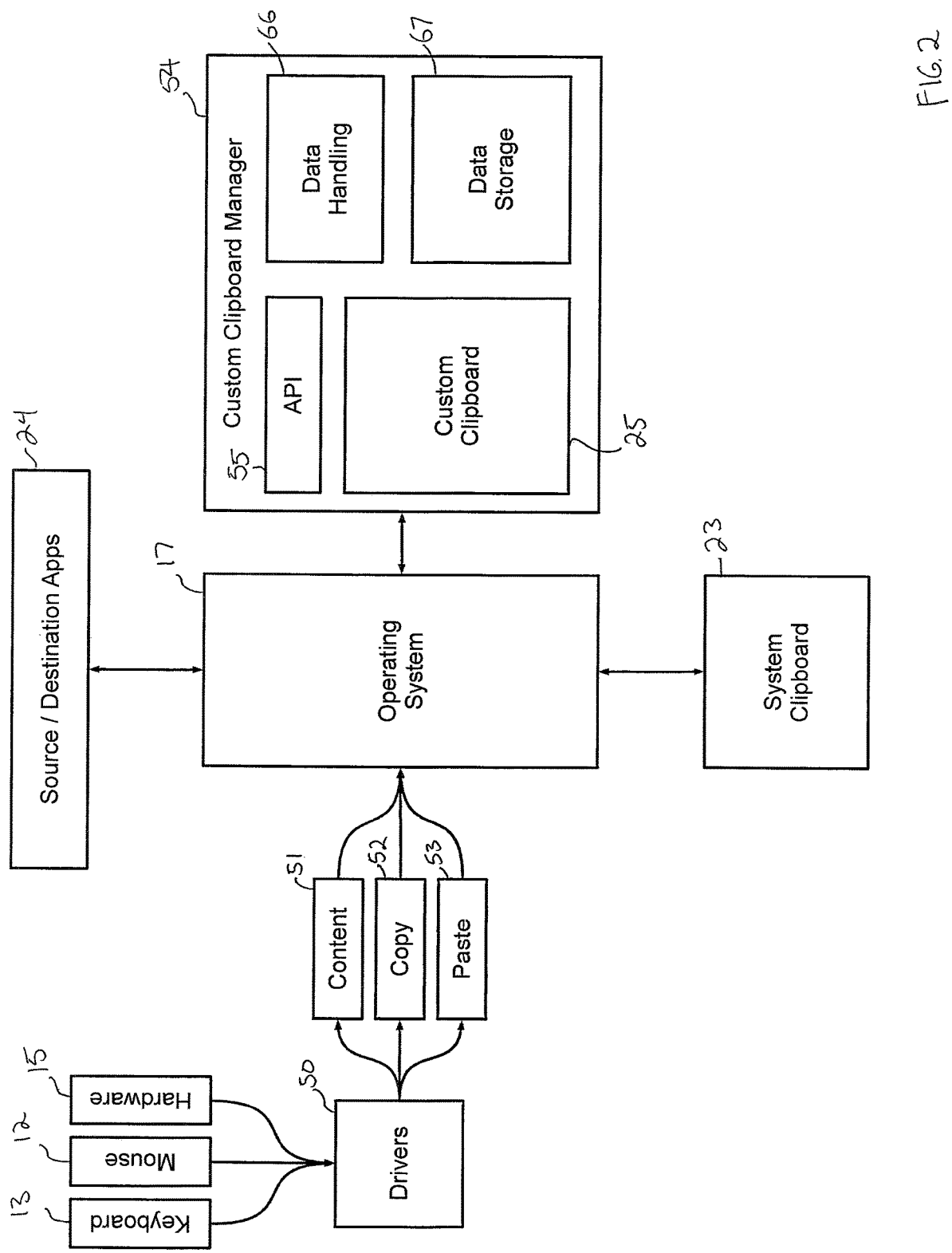
FIG. 2 is a diagram illustrating movement of data among components of the system when executing the method.
Figure 3:
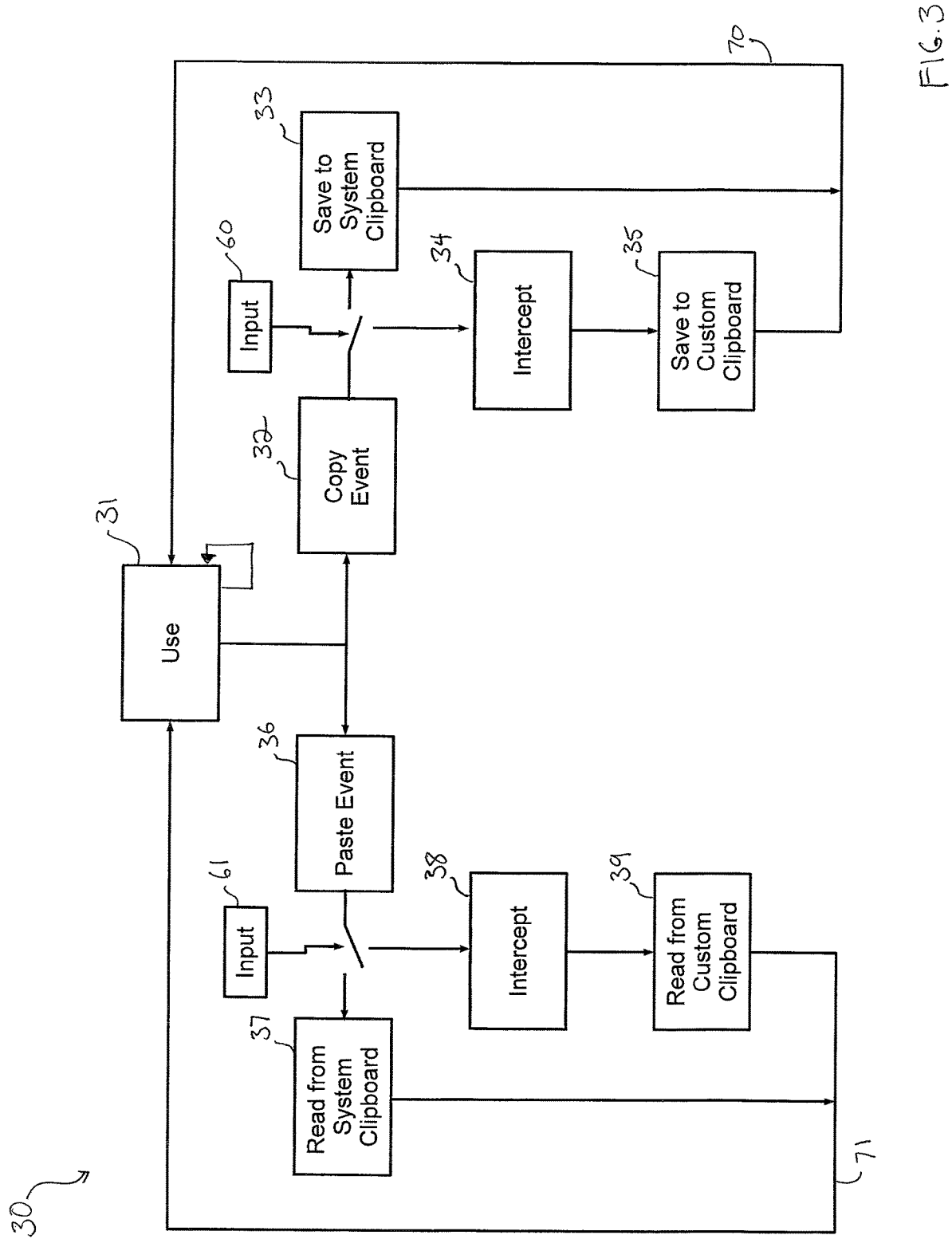
FIG. 3 is a flow diagram illustrating copy and paste functionalities of the method.

FIG. 2 illustrates movement of data among the components of the system 10 when executing a method for transferring multiple data. FIG. 3 illustrates that method 30 schematically. The method 30 begins generally at step 31, in which a user is using the computer 11. The user will browse the Internet, navigate the file structure and data floors on the computer 11, open an application, play a game, type words into a document, and do other things. Eventually, the user will copy a first piece of data at a copy event at step 32.

This specification uses the words "item," "data," or "piece of data" interchangeably to identify the same thing, and those words are meant to include any item, data, object, file, folder, word, letter, or other like thing which can be copied and pasted. For example, and without limiting: a word displayed in a word processor; a cell entry in a spreadsheet program; an image in a web browser, a file on the hard drive, a folder on the hard drive containing subfolders and files.

The user initiates the copy event by selecting the first piece of data with an input device, such as the mouse 12 or keyboard 13, and either selecting from a context menu or entering a keyboard command to copy the data. The user does this in a source or destination location or application 24.

The user first selects the data by clicking on it, double-clicking on it, left- or right-clicking on it, highlighting it, or the like. The user then copies the data by pressing a shortcut key (for example, in Windows: Ctrl-C), by selecting "Copy" from a context menu, by pressing a specific key or button on the mouse 12, keyboard 13, or other hardware 15, by pressing a specific combination or combinations of keys or buttons, or the like.

The computer 11 includes device drivers 50 which control the operation of the mouse 12, keyboard 13, and hardware 15. The device drivers detect the action of the mouse 12, keyboard 13 and/or hardware 15 as input data, and pass that input data to the operating system 17. As shown in FIG. 2, the device drivers pass the content 51 or data that the user selected as well as the selected action of either copy 52 or paste 53 (or cut, in other embodiments).

The computer 11 is specially programmed with a custom clipboard manager software 54. That software 54 includes an event API 55 to intercept copy and paste events and to store or retrieve data from the system clipboard 23 or the custom clipboard 25. The processor 16 executes the method 30 as a combination of instructions from the operating system 17, the software 18, firmware 19, and the custom clipboard manager software 54.

Turning briefly back to FIG. 1, the memory 20 includes the system clipboard 23 and the custom clipboard 25. Preferably, these two clipboards 23 and 25 are separate, but in some embodiments, the event API 55 enhances the system clipboard 23 such that the custom clipboard 25 is the system clipboard 23 with enhanced features.

The system clipboard 23 includes a plurality of locations, each containing unique data 56. Data 56 is stored in the system clipboard 23 sequentially and retrieved sequentially. In other words, "Data 1" is stored and then retrieved, and then "Data 2" is stored and retrieved, and then "Data 3" is stored and retrieved, and so on until an Nth piece of data ("Data N") is stored and retrieved.

The custom clipboard 25 includes a plurality of ordered locations, each containing unique data 56 identified with a unique address or identifier 57.

A first item ("Data 1") is stored in a first location and is identified with a first identifier 57 ("ID 1"), a second item ("Data 2") is stored in a second location and is identified with a second identifier 57 ("ID 2"), a third item ("Data 3") is stored in a third location and is identified with a third identifier ("ID 3"), and so on, until an Nth item ("DATA N") is stored in an Nth location and is identified with an Nth identifier 57.

The memory 20 can have several, dozens, hundreds, thousands, millions, etc. of locations depending on the capacity of the memory 20. However, because this memory 20 is used specifically with the system 10, and because a human user is the intended operator of the system 10, the memory 20 preferably has only a dozen or so locations. In some embodiments, the user is able to configure the system 10 to allocate or open more or less locations and addresses in the memory 20.

The processor 16 writes the item into the memory 20 according to the instructions it receives from the operating system 17, software 18, firmware 19, and the custom clipboard manager software 54.

The event API 55 contains instructions that control whether the processor 16 writes to the system clipboard 23 or the custom clipboard 25. A trigger or input 60 to the system 10 provides the control signal to direct data to the system clipboard 23 or the custom clipboard 25. The input 60 is preferably a keyboard key, but in other embodiments is a button on a specially-designed mouse, in other embodiments is a button or other input on the other hardware 15, and in other embodiments is something else. For example, instead of simply depressing Ctrl-C on a Windows computer to copy data, the user may depress Ctrl-C and the number 1 (Ctrl-C-1), thereby instructing the computer 11 to save the data to the custom clipboard 25 and to the first identifier 57 ("ID1"). Alternatively, as another example, the user may press a special numbered button on the side of the mouse 12 while also selecting "Copy" from the context menu. Both of these are non-limiting examples of ways to engage or provide the input 60.

If the user does not select, depress, or otherwise engage the input 60, then the method 30 proceeds to step 33 ("Save to System Clipboard"). The computer 11 stores the data 56 into the next location in the system clipboard 23.

If the user does select, depress, engage, or otherwise engage the input 60, however, then the method 30 proceeds to step 34 ("Intercept") and step 35 ("Save to Custom Clipboard") (collectively, the Copy Event step 32, Intercept step 34, and Save to Custom Clipboard step 35 are referred to as a "copy step"). These steps are shown diagrammatically in FIG. 4. When there is input 60, the processor 16 instructs the operating system 17, based on the instructions from the event API 55, to pass the copy event to the custom clipboard 25 and save the copy event to the custom clipboard 25. Passing and saving the copy event includes passing the content 51 (including the data 56 and the input 60) and the copy 52 action to the custom clipboard 25. The content 51 includes the data 56 and the input 60. In preferred embodiments, the input 60 includes the identifier 57. For example, where the user depresses Ctrl-C-1, the input 60 include the copied data 56 as well as "1" as the identifier 57 so that the data is stored with "ID 1" in the custom clipboard 25.

The processor 16 writes the data 56 into the custom clipboard 25 with the identifier 57, and the event API 55 instructs the processor 16 to send a confirmation signal 65 back to the operating system 17. In some embodiments, the custom clipboard manager 54 has created the custom clipboard 25 in the memory 20, while in other embodiments, the custom clipboard manager 54 has previously created the custom clipboard 25 in other data storage 67 (as shown in FIG. 2), including cloud storage 21 or other storage 22. In such cases, the API 55 may instruct data handling 66 of the data 56, such as encryption.

Once the first piece of data 56 is stored into the custom clipboard 25, the user can continue to use 31 the system 10, as shown in the return path 70 in FIG. 3. Of course, the computer 11 completes the above steps so quickly—much less than a second—that the user does not notice them occurring. These steps are so imperceptible that the user simply continues to use 31 the system 10 without interruption.

The user may then copy a second piece of data 56, or a third piece of data, or many more. If so, then the method 30 proceeds to step 32 a second time, or a third time, or many more times. The user can copy as many pieces of data as the memory 20 will hold given its size and allocation. The method 30 therefore can perform the copy step N times, where N is an integer greater than zero. FIG. 4 illustrates the copy step for the first piece of data 56, but also illustrates it for a second piece of data 56 and an Nth piece of data 56. With each copy event, the corresponding piece of data 56 is stored in a location in the custom clipboard with a corresponding identifier 57.

FIG. 4 contemplates sequential storing, i.e., a first piece of data 56 is stored into a first location in the custom clipboard 25, and a second piece of data 56 is stored into a second location in the custom clipboard 25, and so on. However, because the input 60 preferably includes both content 51 and the identifier, the system 10 easily accommodates non-sequential storing as well.

In non-sequential storing, the user can store a first piece of data 56 into a first location in the custom clipboard 25, a second piece of data 56 into a fourth location in the custom clipboard 25, a third piece of data 56 into a ninth location, and so on, with any order that the user desires. The user does this by selecting the identifier 57 with the input 60. For example, if the user depresses Ctrl-C-1, then the data 56 is stored into the first location, associated with the identifier "ID 1." When the user depresses Ctrl-C-2, then the data 56 is stored into the second location, associated with the identifier "ID 2." If the user then depresses Ctrl-C-9, then the data 56 is stored into the ninth location, associated with the identifier "ID 9" even if other locations between the second and ninth are empty of data. This allows the user to build and arrange the custom clipboard 25 as he desires.

The above description of the copy step is with respect to the embodiment of the method 30 shown in FIG. 3. In that embodiment, the user selects between copying data to either the system clipboard 23 or the custom clipboard 25 by using the trigger of the input 60. If the user provides the input 60, such as by depressing CTRL-C-1, for example, then the method 30 proceeds to step 34 instead of step 33. In some embodiments of the system 10, however, the method 30 only saves to the custom clipboard 25 in steps 34 and 35 instead of saving to the system clipboard 23 in step 33.

In such modified systems, the method 30 operates slightly differently. When a copy event 32 occurs, if the user does not provide the input 60, then the processor 16 saves to the custom clipboard 25 on a FIFO basis: it first writes the data 56 into the first location corresponding to ID1, and when the next copy event 32 occurs, it writes that data 56 into the second location corresponding to ID2, and so on until all copied data 56 has been written to the custom clipboard 25 sequentially.

If the user does provide the input 60, however, then the user has the option of exercising non-sequential control of the copy functionality. The method 30 proceeds as originally described above, where the user can, for example, copy first to the first location corresponding to ID1, then to the second location corresponding to ID2, then to the ninth location corresponding to ID9. The user can copy in any order he desires.

At some point, the user will desire to paste the data. The user navigates to a location in the source or destination location or application 24. The user places his cursor at the desired location for pasting and then calls up a context menu and selects "Paste," presses a shortcut key (for example, in Windows: Ctrl-V), presses a specific key or button on the mouse 12, keyboard 13, or other hardware 15, or by pressing a specific combination or combination of keys or buttons, or the like. This initiates the Paste Event step 36.

The device drivers 50 detect the action of the mouse 12 and/or keyboard 13 and/or hardware 15 as input data and pass that input data to the operating system 17, as shown in FIG. 2. In this paste event, the input data includes the content 51 and the paste 53 action. The content 51 may or may not include input 61 from the user.

Like the input 60, the input 61 is preferably a keyboard key, but in other embodiments is a button on a specially-designed mouse, in other embodiments is a button or other input on the other hardware 15, and in other embodiments is something else. For example, instead of simply depressing Ctrl-V on a Windows computer to paste data, the user may depress Ctrl-V and the number 1 (Ctrl-V-1), thereby instructing the computer 11 to retrieve the data from the custom clipboard 25 at the first identifier 57 ("ID1"). Alternatively, as another example, the user may press a special numbered button on the side of the mouse 12 while also selecting "Paste" from the context menu. Both of these are non-limiting examples of ways to engage or provide the input 61.

If the user does not select, depress, or otherwise engage the input 61, then the method 30 proceeds to step 37 ("Read from System Clipboard"). The computer 11 retrieves the data 56 from the last-filled location in the system clipboard 23.

If the user does select, depress, or otherwise engage the input 61, however, then the method 30 proceeds to step 38 ("Intercept") and step 39 ("Read from Custom Clipboard") (collectively, the Paste Event step 36, Intercept step 38, and Read from Custom Clipboard step 39 are referred to as a "paste step"). These steps are shown diagrammatically in FIG. 5. When there is input 61, the processor 16 passes the paste event to the to the event API 55. The processor 16 then instructs the operating system 17, based on received instructions from the event API 55, to pass the paste event to the custom clipboard 25, which includes passing both the content 51 and the paste action 53 to the custom clipboard 25. The content 51 includes the location and the input 61. In preferred embodiments, the input 61 includes the identifier 57. For example, where the user depresses Ctrl-V-1, the input 61 includes the "1" as the identifier 57 so that the processor 16 is instructed as to which buffer location in the custom clipboard 25 to look for and retrieve the data.

The processor 16 reads the data 56 from the custom clipboard 25 at the location corresponding to the identifier 57 provided in the input 61, and the event API 55 instructs the processor 16 to send a confirmation signal 65 back to the operating system 17. If the data 56 was encrypted or stored in the other data storage 67, then the processor 16 also performs data handling on the data 56 so that it is usable in the pasted location.

Once the processor 16 has read the data 56 out of the custom clipboard, it then writes or pastes that data 56 in the location provided by the user. The user then continues to use 31 the system 10, as shown in the return path 71 in FIG. 3. Of course, the computer 11 completes the above steps so quickly—much less than a second—that the user does not notice them occurring. These steps are so imperceptible that the user simply continues to use 31 the system 10 without interruption.

The user may then paste a second piece of data 56, or a third piece of data, or many more. If so, then the method 30 proceeds to step 36 a second time, or a third time, or many more times. The user can paste as many pieces of data as the custom clipboard 25 holds at the time. The method 30 therefore can perform the paste step P times, where P is an integer greater than zero but less than or equal to N, the number of times the copy step was performed. FIG. 5 illustrates the paste step for the first piece of data 56, but also illustrates it for a second piece of data 56 and an Nth piece of data 56. With each paste event, the corresponding piece of data 56 is retrieved from its location in the custom clipboard 25 with a corresponding identifier 57.

Like the copy steps, FIG. 5 contemplates sequential retrieval, i.e., a first piece of data 56 is read from a first location in the custom clipboard 25, and a second piece of data 56 is read from a second location in the custom clipboard 25, and so on. However, because the input 61 preferably includes the identifier 57, the system 10 easily accommodates non-sequential retrieval as well.

In non-sequential retrieval, the user can call up data in a non-sequential order by selecting the identifier 57 with the input 60. For example, if the user depresses Ctrl-V-1, then the data 56 is read from the first location associated with the identifier "ID 1." When the user depresses Ctrl-V-2, then the data 56 is read from the second location associated with the identifier "ID 2." If the user then depresses Ctrl-V-9, then the data 56 is read from the ninth location associated with the identifier "ID 9" even if other locations between the second and ninth are empty of data.

The above description of the paste step is with respect to the embodiment of the method 30 shown in FIG. 3. In that embodiment, the user selects between pasting data from the system clipboard 23 or the custom clipboard 25 by using the trigger of the input 61. If the user provides the input 61, such as by depressing CTRL-V-1, for example, then the method proceeds to step 38 instead of step 37. In some embodiments of the system 10, however, the method 30 only reads from the custom clipboard 23 in steps 38 and 39 instead of reading from the system clipboard 25 in step 37.

In such modified systems, the method 30 operates slightly differently. When a paste event 36 occurs, if the user does not provide the input 61, then the processor 16 reads from the custom clipboard on a FIFO basis: it reads the data 56 in the first location corresponding to ID1, and when the next paste event 36 occurs, it reads the data 56 in the second location corresponding to ID2, and so on until all data 56 has been read from the custom clipboard 25. This allows a user to sequentially paste data out of the memory 20 in the same order that he copied it.

If the user does provide the input 61, however, then the user has the option of exercising non-sequential control of the paste functionality. The method 30 proceeds as originally described above, where the user can, for example, paste first from the first location corresponding to ID1, then from the second location corresponding to ID2, then from the ninth location corresponding to ID9. This allows the user to paste in any order he desires, and is helpful where the user knows accurately the location or the order of the data in the custom clipboard 25. In some embodiments of the system 10, the custom clipboard manager 54 will instruct the processor 16 to display the ordered contents of the custom clipboard 25 on the monitor 14 so the user can view it as he pastes.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A method comprising the steps of:
   providing a computer with a processor, a system clipboard for storing data, and a custom clip-board for storing data;
   intercepting a first copy event for a first data to the system clipboard;
   in response to intercepting the first copy event, passing the first copy event to an event API, the event API instructing the processor to process the first copy event by saving the first data in the custom clipboard and assigning the first data to a first identified location in the custom clipboard; and then
   intercepting a second copy event for a second data to the system clipboard;
   in response to intercepting the second copy event, passing the second copy event to the event API, the event API instructing the processor to process the second copy event by saving the second data in the custom clipboard and assigning the second data to a second identified location in the custom clipboard, while maintaining the first data in the custom clipboard without altering the first data or the first identified location;
   and then
      intercepting a paste event comprising a specific identified location; and
      reading, in response to intercepting the paste event, data in the custom clipboard with the first or second identified location corresponding to the specific identified location.

2. The method of claim 1, wherein the step of intercepting a first paste event occurs before the step of intercepting a second paste event.

3. The method of claim 1, wherein the step of intercepting a second paste event occurs be-fore the step of intercepting a first paste event.

4. The method of claim 1, further comprising maintaining all data in the custom clipboard after intercepting the paste event comprising the specific identified location.

5. The method of claim 1, further comprising:
   intercepting a subsequent paste event comprising a specific subsequent identified location; and
   reading, in response to intercepting the subsequent paste event, data in the custom clipboard with the first or second identified location corresponding to the specific subsequent identified location.

6. The method of claim 5, wherein the steps of intercepting the first copy event, intercepting the second copy event, intercepting the paste event, and intercepting the subsequent paste event occur sequentially.

7. The method of claim 5, wherein the steps of intercepting the first copy event, intercepting the second copy event, intercepting the first paste event, and intercepting the subsequent paste event occur non-sequentially.

8. The method of claim 1, further comprising;
providing first and second input devices; and
performing the step of intercepting a first copy event in response to input from both of the first and second input devices, wherein the input comprises a first identifier; and
the step of assigning the first data to the first identified location includes assigning the first data to the first identified location using the first identifier to uniquely order the first data on the custom clipboard;
performing the step of intercepting a second copy event in response to input from both of the first and second input devices, wherein the input further comprises a second identifier; and
the step of assigning the second data to the second identified location includes assigning the second data to the second identified location using the second identifier to uniquely order the second data on the custom clipboard.

9. The method of claim 8, wherein:
the step of reading, in response to intercepting the paste event, data in the custom clipboard with the first or second identified location corresponding to the specific identified location, further includes using the first or second identifier to locate the respective data in the custom clipboard; and
the step of reading, in response to intercepting the subsequent paste event, data in the custom clipboard with the first or second identified location corresponding to the specific subsequent identified location, further includes using the first or second identifier to locate the respective data in the custom clipboard.

10. The method of claim 1, wherein the copy event is a copy function.

11. The method of claim 1, wherein the copy event is a cut function.

12. A method comprising the steps of:
providing a computer with a processor, a system clipboard for storing data, and a custom clip-board for storing data;
iteratively intercepting a plurality of copy events to the system clipboard;
for each copy event intercepted, saving a data in the custom clipboard and assigning a unique identified location to the respective data, wherein the custom clipboard is configured to maintain a plurality of data;
intercepting a paste event comprising an identifier;
in response to intercepting the paste event, fetching, from the custom clipboard, the data in the unique identified location that corresponds to the identifier, said data defining a paste data element; and
reading the paste data element from the custom clipboard.

13. The method of claim 12, further comprising;
providing first and second input devices; and
performing the step of iteratively intercepting the plurality of copy events in response to input from both of the first and second input devices.

14. The method of claim 13, further comprising performing the step of intercepting the paste event in response to input from both of the first and second input devices.

15. The method of claim 12, wherein, the step of saving a data to the custom clipboard and assigning a unique identified location to the respective data further includes:
automatically assigning the data to the unique identified location in sequential order based on an order in which the copy events are intercepted; and
assigning the respective data in the custom clipboard with a unique identifier corresponding to the unique identified location and the order in which the copy events are intercepted.

16. The method of claim 15, wherein the step of intercepting the paste event occurs among iterations of the step of iteratively intercepting the plurality of copy events.

17. The method of claim 12, further comprising, for each copy event, maintaining prior data which was saved in the custom clipboard prior to the respective data being saved, without altering said prior data or the unique identified location assigned to the respective data.

18. The method of claim 17, wherein the step of intercepting the paste event further comprises maintaining the prior data saved in the custom clipboard.

19. The method of claim 12, wherein the copy event is a copy function.

20. The method of claim 12, wherein the copy event is a cut function.

* * * * *